United States Patent
Dickson (10) Patent No.: US 10,760,277 B2
(45) Date of Patent: Sep. 1, 2020

(54) APPARATUS FOR REDUCING WATER NOISE

(71) Applicant: Joyce Faulkner Dickson, San Mateo, CA (US)

(72) Inventor: Joyce Faulkner Dickson, San Mateo, CA (US)

( * ) Notice: Subject to any disclaimer, the term of this patent is extended or adjusted under 35 U.S.C. 154(b) by 0 days.

(21) Appl. No.: 16/104,245

(22) Filed: Aug. 17, 2018

(65) Prior Publication Data

US 2019/0063071 A1 Feb. 28, 2019

Related U.S. Application Data

(60) Provisional application No. 62/549,365, filed on Aug. 23, 2017.

(51) Int. Cl.
*F16L 55/02* (2006.01)
*E04D 13/08* (2006.01)
*E04D 13/00* (2006.01)

(52) U.S. Cl.
CPC ............ *E04D 13/08* (2013.01); *E04D 13/008* (2013.01); *E04D 2013/0813* (2013.01); *F16L 55/02* (2013.01)

(58) Field of Classification Search
CPC ...... E04D 2013/086; E04D 2013/0866; E04D 13/0767; F16L 55/02709
USPC ................ 138/39, 41, 42; 52/12, 16, 144; 210/433.1, 130
See application file for complete search history.

(56) References Cited

U.S. PATENT DOCUMENTS

| | | | | |
|---|---|---|---|---|
| 1,653,473 A * | 12/1927 | Schulz | .................... | B01D 35/28 210/130 |
| 4,470,908 A * | 9/1984 | Odekirk | ................. | B01D 35/00 210/463 |
| 4,798,028 A * | 1/1989 | Pinion | ....................... | E03F 1/00 285/148.23 |
| 5,159,789 A * | 11/1992 | Haapanen | ............... | E04D 13/08 52/12 |
| 5,657,582 A * | 8/1997 | Chitwood | ............... | E04D 13/08 138/109 |
| 5,709,051 A * | 1/1998 | Mazziotti | ............... | E04D 13/076 210/162 |
| 8,033,058 B2 * | 10/2011 | Block | ..................... | E04D 13/08 210/162 |
| 8,656,947 B1 * | 2/2014 | Barton | .................... | E04D 13/08 137/544 |
| 8,715,495 B1 * | 5/2014 | Smith | ................. | E04D 13/0767 210/162 |
| 9,416,543 B1 * | 8/2016 | Fox | ..................... | E04D 13/0767 |
| 2008/0086953 A1 * | 4/2008 | Graf | .......................... | E03B 3/02 52/12 |
| 2008/0229673 A1 * | 9/2008 | LaMorte | ................. | E04D 13/08 52/12 |

* cited by examiner

*Primary Examiner* — Patrick F Brinson
(74) *Attorney, Agent, or Firm* — Dergosits & Noah LLP (57) ABSTRACT

A device for reducing and/or eliminating water noise. A screen made of waterproof material has small holes distributed across its entire surface, to reduce the size of water droplets exiting the screen to less than 5 mm.

17 Claims, 10 Drawing Sheets

APPARATUS FOR REDUCING WATER NOISE

CROSS REFERENCE

This application claims the benefit of U.S. Provisional Patent Application No. 62/549,365 entitled System for Reducing Noise Made by Water Droplets, filed Aug. 23, 2017, and incorporated by reference herein in its entirety.

BACKGROUND

The noise of water exiting a water pipe can be undesirable. For example, during a light rain or after a heavy rain, the dripping sound of raindrops at the bottom of a downspout can be bothersome to a person trying to sleep. Therefore, there is a need for a device that reduces or eliminates noise made from water exiting a water pipe. The pipe may be a downspout or any other pipe that carries water.

BRIEF SUMMARY

Disclosed is a device for reducing and/or eliminating noise made by water exiting a water pipe such as a downspout. The device is designed to reduce the size of water drops as the water exits the bottom of a water pipe. For example, the device reduces the size of water drops exiting a downspout during a light rain or after a heavy rain. By breaking up the larger water drops into smaller water droplets, the sound made by the water falling from the pipe onto a surface is greatly reduced or eliminated.

BRIEF DESCRIPTION OF THE DRAWINGS

FIG. 6A is a perspective view.

FIG. 8A is a perspective view.

DETAILED DESCRIPTION

This disclosure describes an apparatus that reduces or eliminates the noise made by water exiting a downspout or other drain pipe by reducing the size of water particles to tiny water droplets. For example, the United States Geological Survey tells us that a single raindrop is formed when lots of tiny moisture droplets (ranging from 0.0001 cm to 0.005 cm) coalesce together to reach a combined size of approximately 0.5 mm (1/64 inch). Further, if a rain drop gets larger than approximately 4 mm (5/32 inch), it will usually split into two separate rain drops. Thus, by employing a drip screen or filter device having small openings that reduce and restrict the size of water particles flowing through the device, significantly less noise is generated by the flowing or dripping water. We have found that a device having holes less than approximately 5 mm (13/64 inches) is effective to reduce or eliminate water noise.

Figure 1:
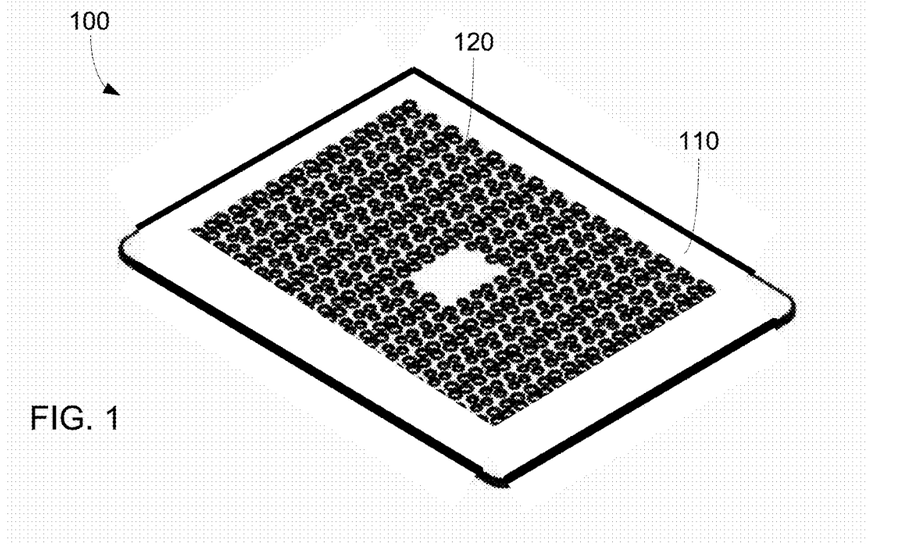
FIG. 1 is a perspective view illustrating a first embodiment of a device for reducing and/or eliminating water noise.

For example, as shown in FIG. 1, a device 100 for reducing and/or eliminating noise made from dripping water includes a surface 110 made from waterproof material. The device 100 includes a plurality of small holes 120 formed through the device. For example, the small holes are less than 5 mm in diameter, formed uniformly across substantially the entirety of the device. The device 100 may be a single integrated device made entirely of a waterproof material that is sturdy yet pliable, including copolymers such as propylene, thermoplastic elastomer, or santoprene, or any other waterproof material such as rubber or neoprene, foam, or plastic, or combinations of waterproof materials. Alternatively, the device 100 may be fully or partially enclosed by a frame (not shown) or have connectors or hinges (not shown) that facilitate coupling the device at or near the bottom of a downspout or other drain pipe. The device 100 may be formed by injection molding or stamping.

The shape and size of the device 100 may vary according to the application and may be customized or designed for standard size pipes. For example, the device 100 may be shaped and sized for use with one or more standard downspout configurations, such as a 3 inch or 4 inch rectangular downspout and downspout extenders. In one embodiment, the device measures 0.5 inches thick by 3.125 inches wide by 4.125 inches long. In some instances, when the device is bigger than the pipe or the bottom portion of the pipe, the device is flexible enough so that it can be manipulated to fit smaller pipes. For example, a device designed to fit all 3 or 4 inch downspouts can be fit into round downspouts or anything smaller than 3 inches simply by bending the device. The device is waterproof and rustproof as it does not hold water and will not rust in the downspout.

The surface 110 may further include a plurality of protrusions and/or depressions configured along one or more sides or edges of the surface. For example, multiple protrusions can be formed to extend from the top and/or bottom surfaces of the device. Likewise, multiple depressions can be formed extending laterally to the edges of the device, for example, as simple straight line trenches cut into the surface of the device. The protrusions and depressions can serve to help drain water along the edges of the device 100 as well as through the holes 120. Protrusions may also be used to stack multiple devices on top of each other. In one embodiment, the surface may be a substantially planar surface.

As noted above, the device 100 is intended to be used at the bottom or near the bottom of a drain pipe or downspout. For example, the device 100 may be secured about 1 inch from the bottom of the downspout, or it may be fitted snugly at the bottom of the downspout, or it may be inserted into the bottom portion of the downspout. In another example, the device 100 may be inserted at the bottom junction of the downspout where the straight angle of the downspout meets another angled junction. Therefore, when water exits the bottom of the pipe, it lands on the surface of the device 100 and passes through the small holes 120 formed in the surface 110. As the water passes through the small holes, the size of the water dropping from the underside of the device 100 is significantly reduced.

Figure 2:
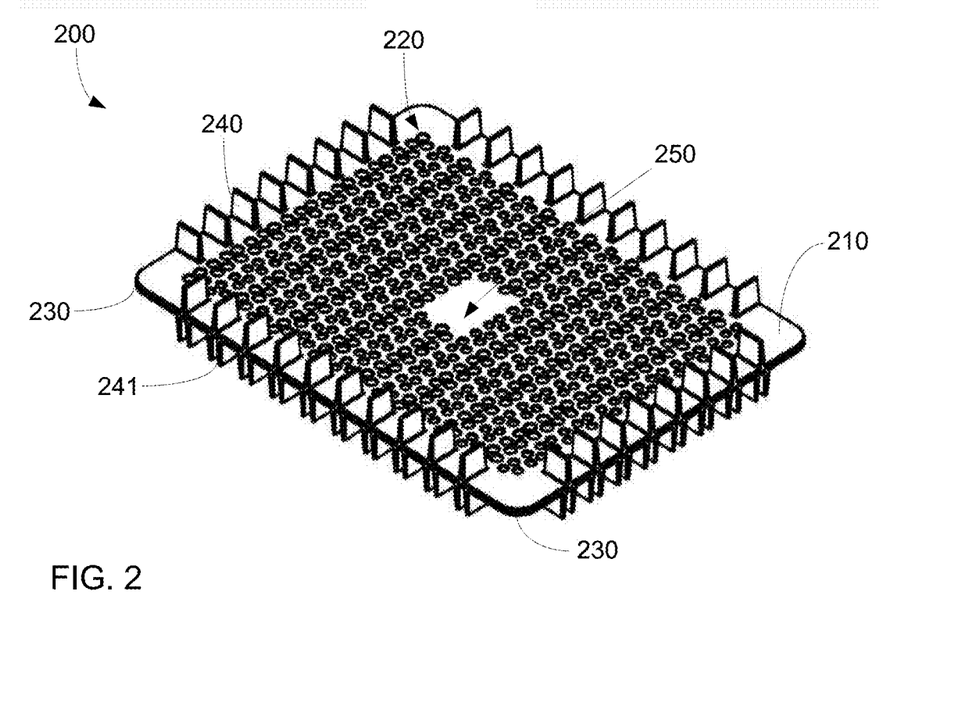
FIG. 2 is a perspective view illustrating a second embodiment of a device for reducing and/or eliminating water noise.

FIG. 2 illustrates another embodiment of a device 200 for reducing and/or eliminating water noise. The device 200 includes a top surface 210 having a plurality of small holes 220 formed through the device, just like device 100. In this embodiment, however, the edges 230 of the device 200 include a first plurality of vertical protrusions 240 extending above the top surface 210 and a second plurality of vertical protrusions 241 extending below the bottom surface. In one embodiment, the protrusions 240, 241 at the edges 230 of the device 200 are referred to as "alligator teeth." The alligator teeth 240, 241 may be used to ensure that the device 200 does not lay flat at the bottom of the downspout; to allow multiple devices to be securely stacked one on top of another; and to allow runoff of the water through the protrusions 240, 241 along the edges 230 of the device 200. The alligator teeth 240, 241 may also allow for a space to be created between the flat planar area of the device 200 and the bottom of the pipe, the ground, or another stacked device, allowing space for water to drain away through the protrusions along the edge 230.

In one embodiment, the device 200 may include a gate location 250 where the material used to make the device is inserted into a mold that creates the device. The gate location 250 is selected to allow the most even distribution of the material and may result in the gate location being a solid portion of the surface 210 without small holes. Although FIG. 2 illustrates the gate location 250 at the center of the device 200, the gate location may be at some other place on the device.

In one embodiment, the device 200 is designed to be inserted into the downspout or pipe or into the angled part of the downspout of pipe. However, the position, placing and attachment to the downspout may vary in different applications.

Figure 3A:
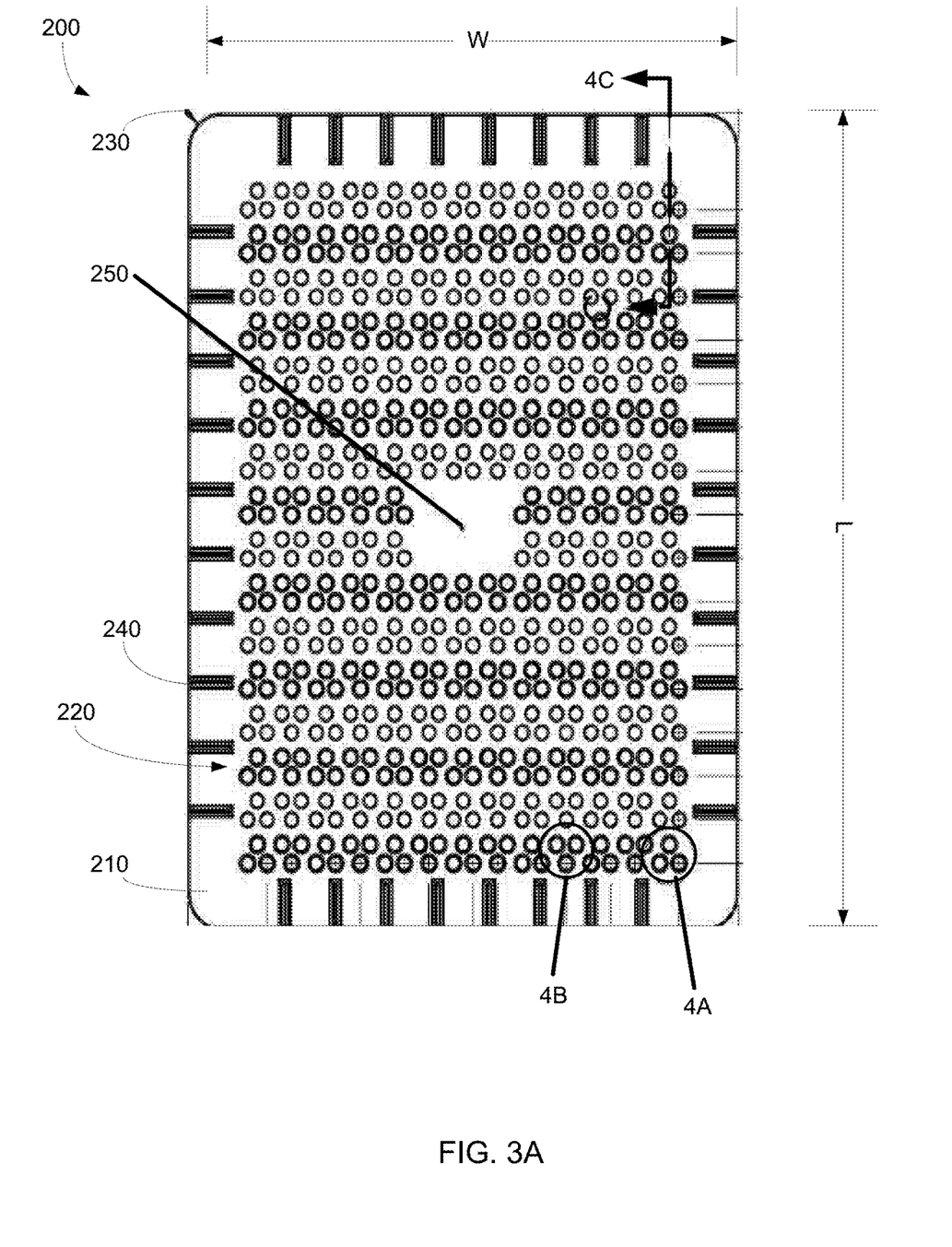
FIG. 3A is a top plan view of the device shown in FIG. 2.
Figure 3B:
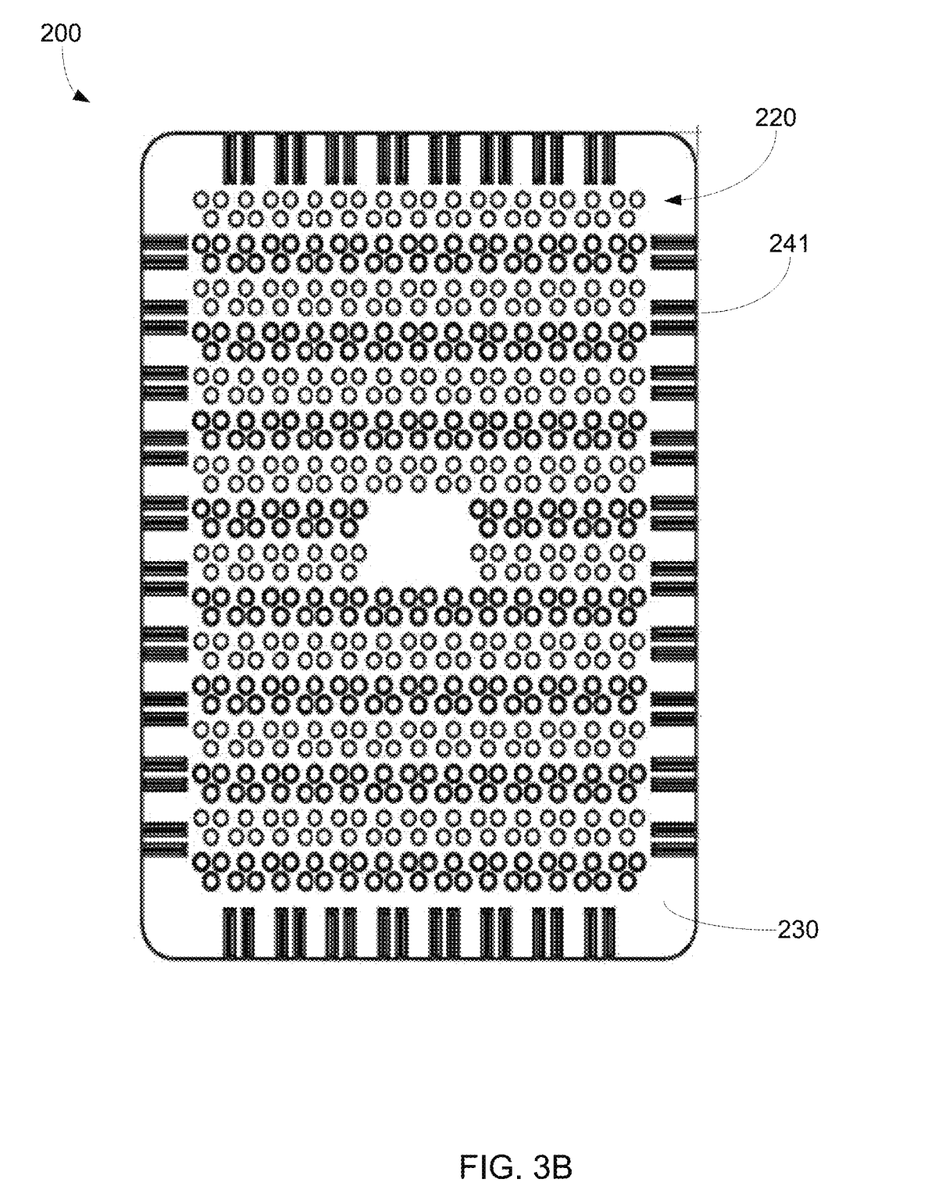
FIG. 3B is a bottom plan view of the device shown in FIG. 2.

FIG. 3A illustrates a top view of the device 200 for reducing and/or eliminating water noise while FIG. 3B illustrates the bottom view. In one embodiment, the device 200 has a width W of 3.125 inches and a length L of 4.125 inches. The small holes 220 are distributed across substantially the entire surface 210 of device 200, as illustrated in more detail in FIGS. 4A and 4B. The protrusions 240 are formed adjacent each of the four edges 230 on top of surface 210, for example, spaced apart at intervals of 0.325 inches. The protrusions 241 are formed adjacent each of the four edges 230 on the bottom of surface 210. However, the bottom protrusions 241 are formed in pairs, where the individual protrusions in a pair are spaced apart at an interval of 0.1 inch while the pairs are spaced apart from each other by an interval of 0.225 inches. This spacing of the bottom protrusions 241 allows the top protrusions 240 to be interposed between the bottom protrusions, for example, when multiple devices are stacked one on top of the other.

Figure 4A:
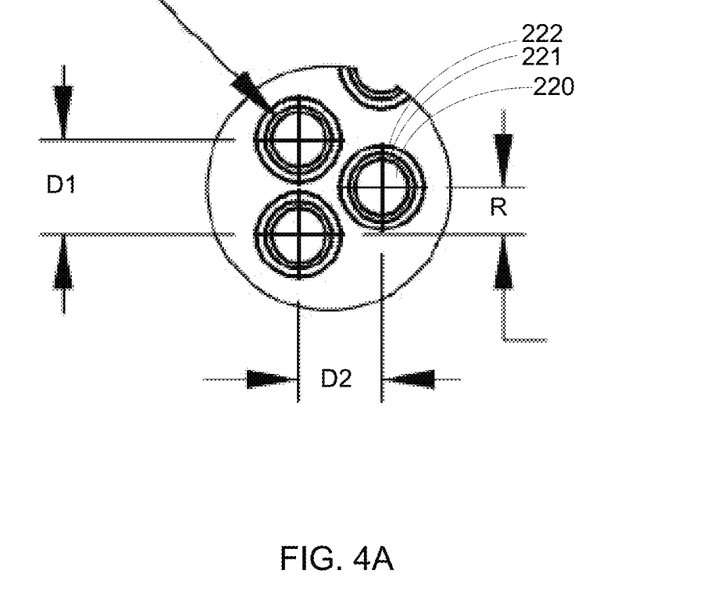
FIG. 4A is a sectional view taken across section 4A-4A of FIG. 3A.
Figure 4B:
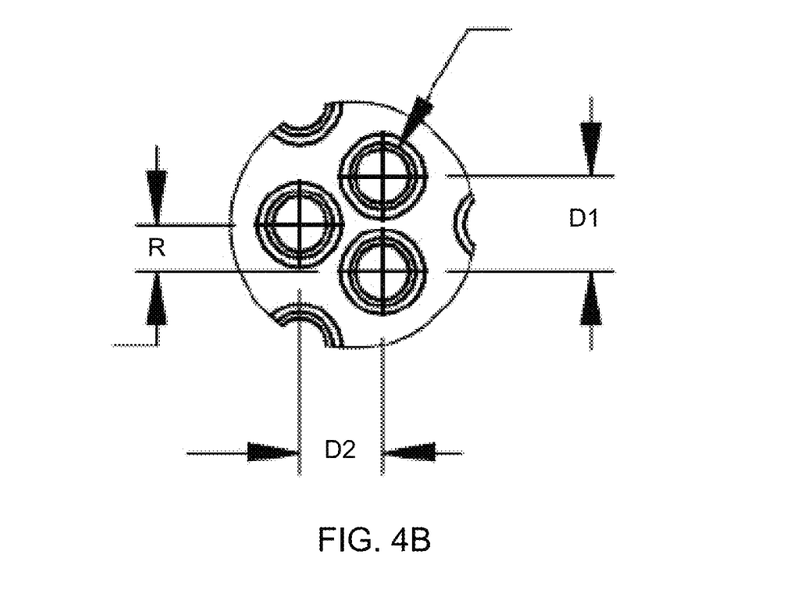
FIG. 4B is a sectional view taken across section 4B-4B of FIG. 3A.

FIGS. 4A and 4B illustrate an example of the pattern of the holes 220 formed in the device, taken across two different sections of device 200. In both sections, the holes 220 are spaced apart from each other 0.110 inches in the horizontal direction and 0.095 inches in the vertical direction. Each of the holes 220 has a radius of 0.055 inches. Each of the holes 220 also has a first annular recess 221 surrounding the hole and a second annular recess 222 surrounding the first annular recess. The annular recesses 221, 222 may be formed only on the one of the top and bottom surfaces or on both surfaces. Although two annular recesses 221, 222 are shown surrounding each hole in the illustrated embodiment, there might be only a single annular recess or more than two annular recesses. Providing the annular recesses 221, 222 helps to facilitate the breaking down of water into smaller droplets.

Figure 4C:
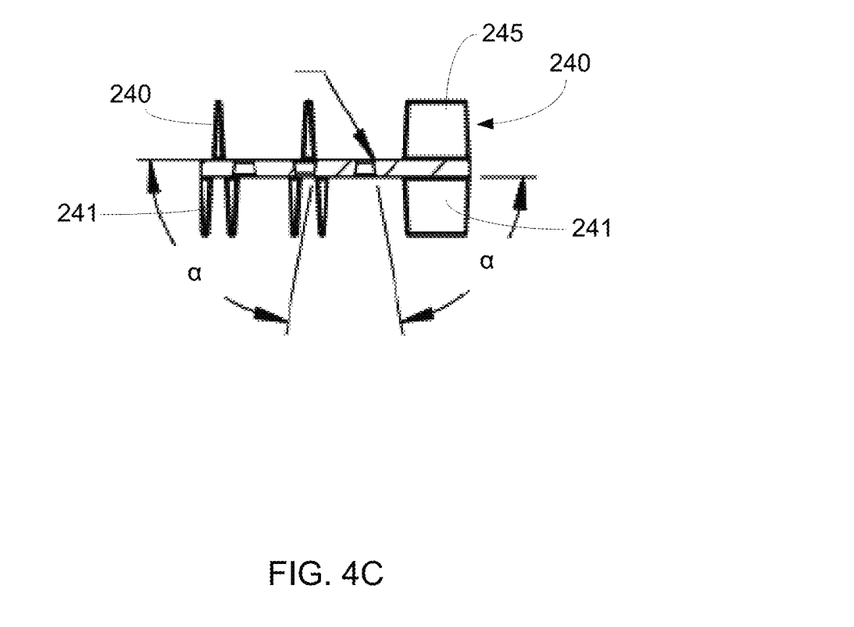
FIG. 4C is a sectional view taken across section 4C-4C of FIG. 3A.

FIG. 4C illustrates the single protrusions 240 formed on the top surface of the device 200, and the paired protrusions 241 formed on the bottom surface, offset from the top protrusions so that the top protrusions will be interposed with the bottom protrusions when one device is stacked on top of another device. Further, each of the top and bottom protrusions are formed as a triangular shape having a pair of broad face portions 245 that are angled toward each other, with the face portions tilted at an angle α relative to the horizontal plane of the device. For example, the angle α may be 80 degrees. The face portions 245 may be ¼ inch tall and wide.

Figure 5:
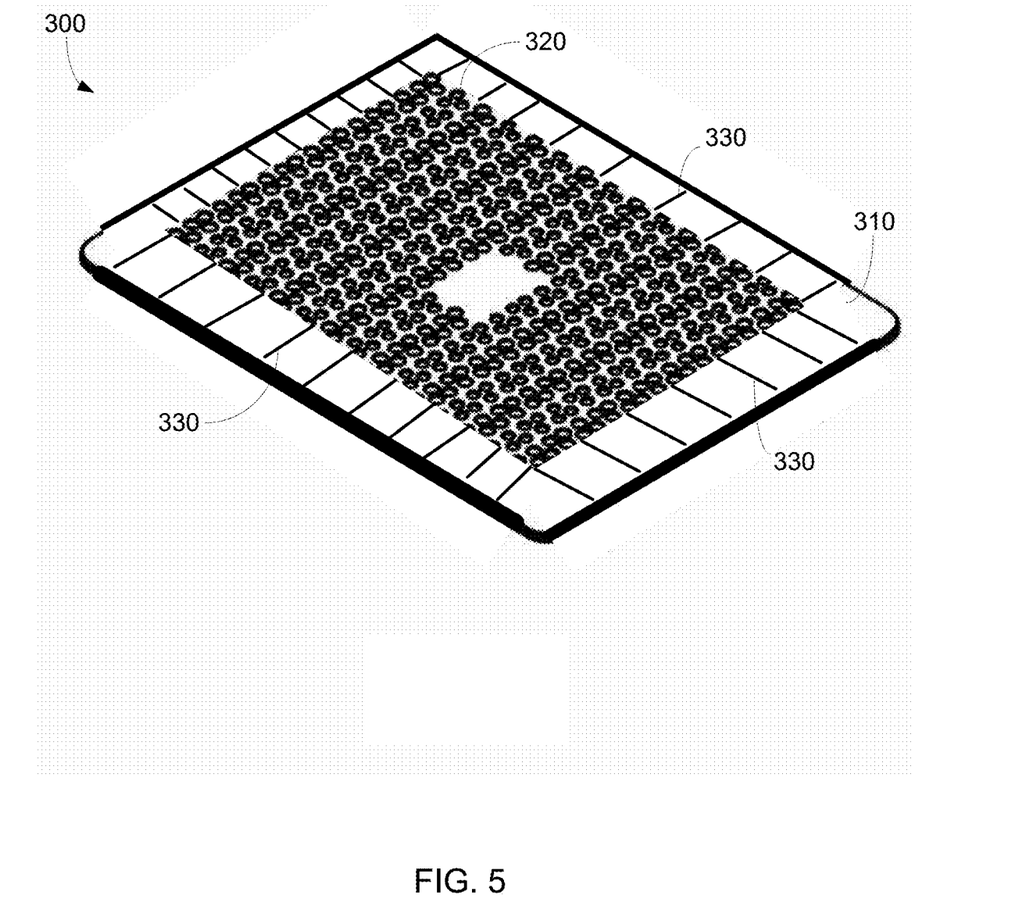
FIG. 5 is a perspective view illustrating a third embodiment of a device for reducing and/or eliminating water noise.

FIG. 5 illustrates another example of a device 300 for reducing or eliminating water noise, with the holes 320 distributed uniformly across the surface 310, as in other embodiments. In this embodiment, however, multiple depressions 330 are formed on the surface 310 to help drain water away from the surface. For example, small straight trenches measuring 1/16 inch wide and 1/16 inch deep may be formed. Trenches may be formed on one side or on both sides of the device 300. Further, in another embodiment, trenches may be formed between protrusions.

Figure 6A:
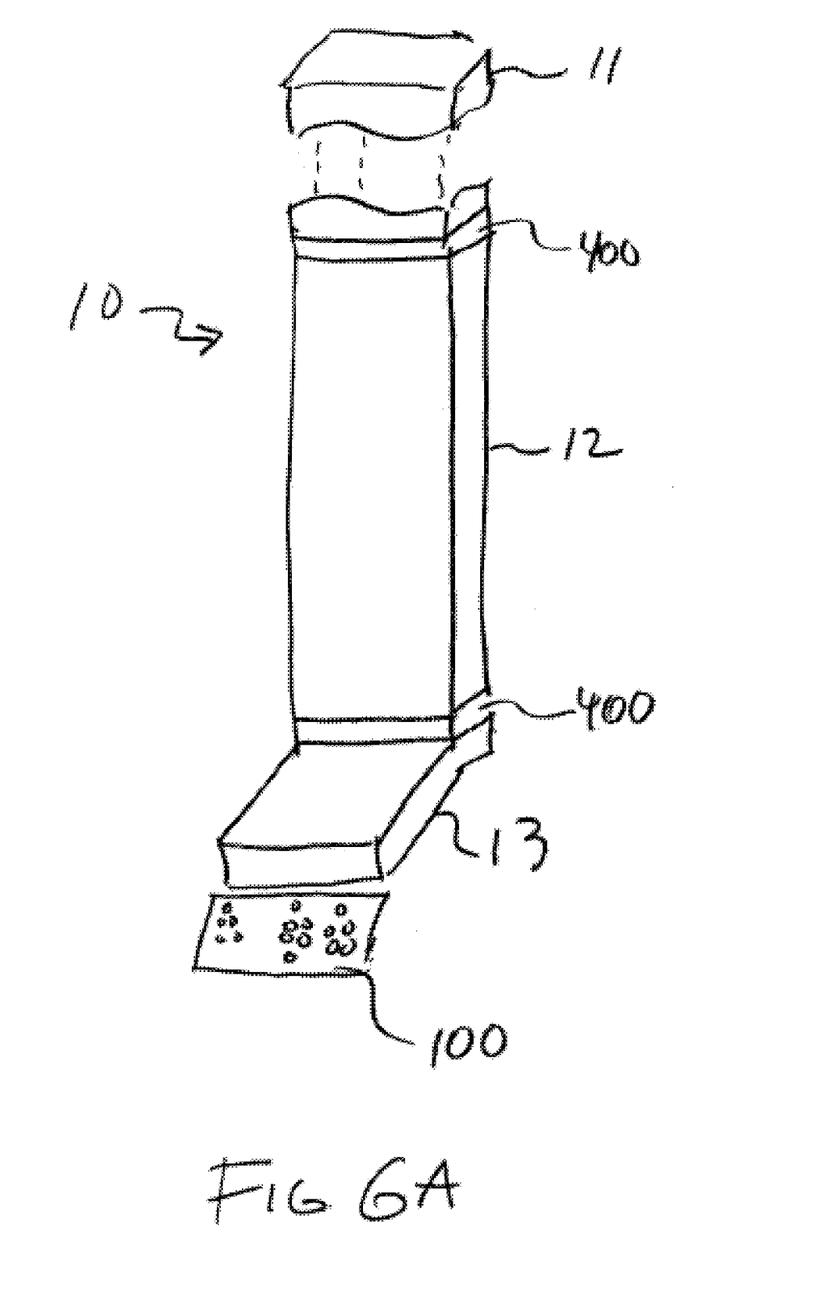
Figure 6B:
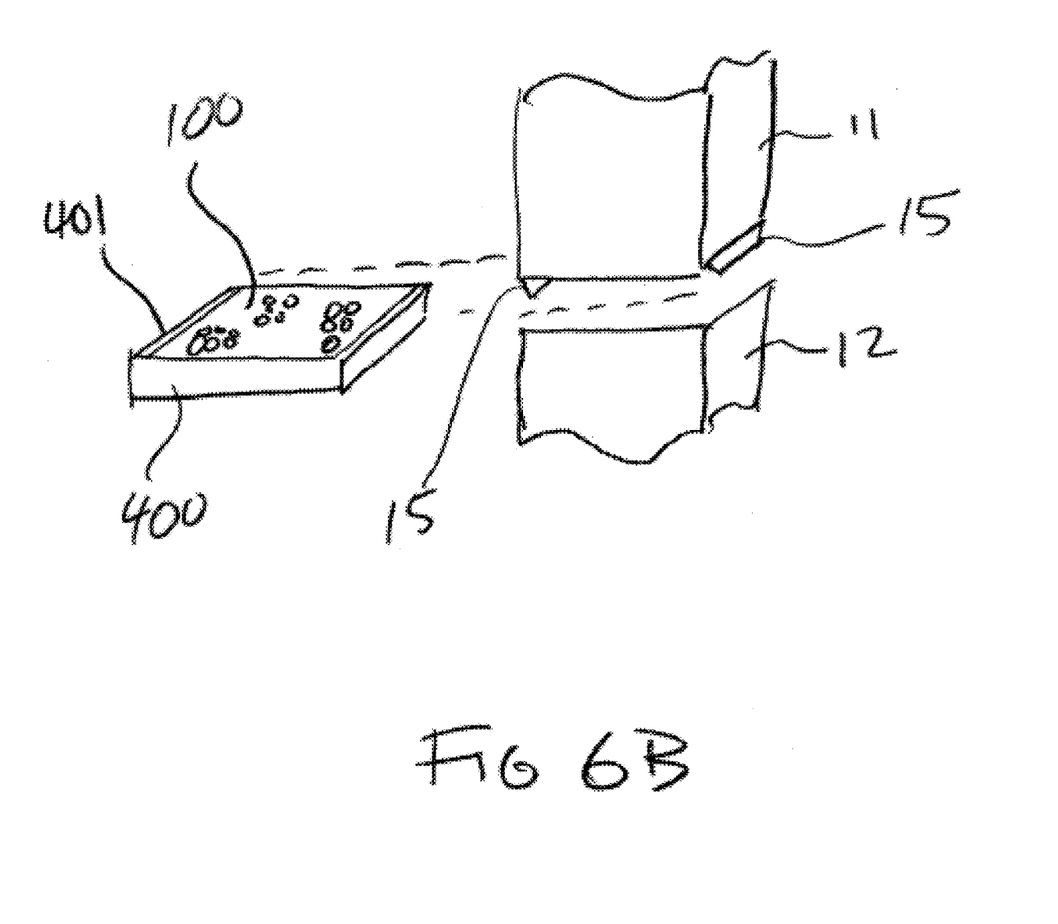
FIG. 6B is an exploded perspective view, both illustrating an application of the device in a downspout.

FIGS. 6A and 6B illustrate an application of the water noise reducing device 100. In this embodiment, the device 100 is used in three different positions to help reduce water noise in a long downspout 10. For example, the downspout may be divided into sections, namely, a straight top section 11, a straight bottom section 12, and an angled outlet 13. A device 100 is encased in a frame 150 and is inserted into a prepared location between top section 11 and bottom section 12. Similarly, a second device 100 and frame 150 is inserted into a prepared location between bottom section 12 and angled outlet 13.

As shown in FIG. 6B, the bottom of downspout portion 11 may be configured with tabs 15, and the frame 400 may be configured with corresponding slots 401 on both sides of the downspout portion. As the frame 400 is inserted into the downspout portion 11, the tabs 15 slide into the slots 401 to hold the frame and device 100 in place. The bottom of downspout portion 12 may be similarly configured to receive a frame and device. A third device 100 may be placed adjacent the outlet 13. Thus, three devices are placed in series in a long downspout configuration. Other means of connecting a frame element to the downspout could be employed.

Thus, the device may be used as part of a replaceable cartridge, or the device is simply replaceable in a slide-out frame, as shown above. Alternatively, devices (or cartridges) can be made to have different sized holes, for example, to handle a heavy water flow (larger holes) or a light water flow (smaller holes). In one embodiment, the hole density is 8 holes per square inch. However, the hole density may be larger or smaller depending on the particular application.

Figure 7A:
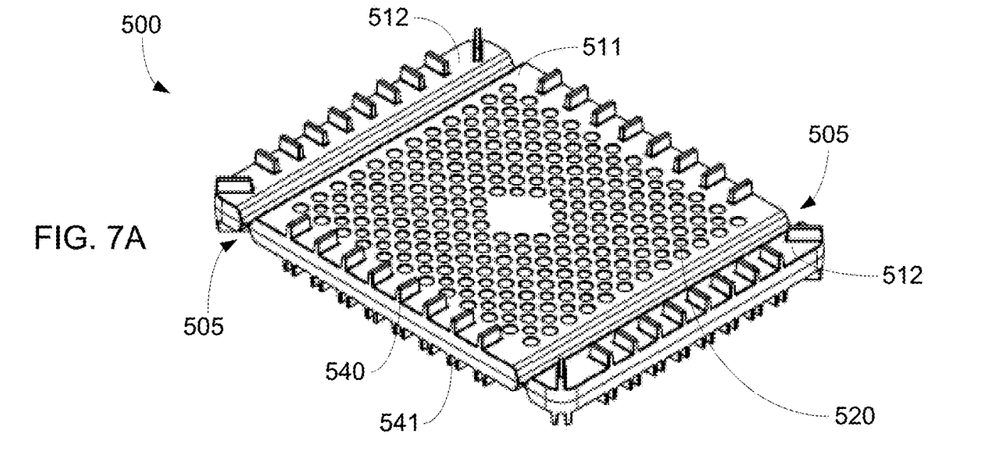
FIG. 7A is a perspective view illustrating a fourth embodiment of a device for reducing and/or eliminating water noise.
Figure 7B:
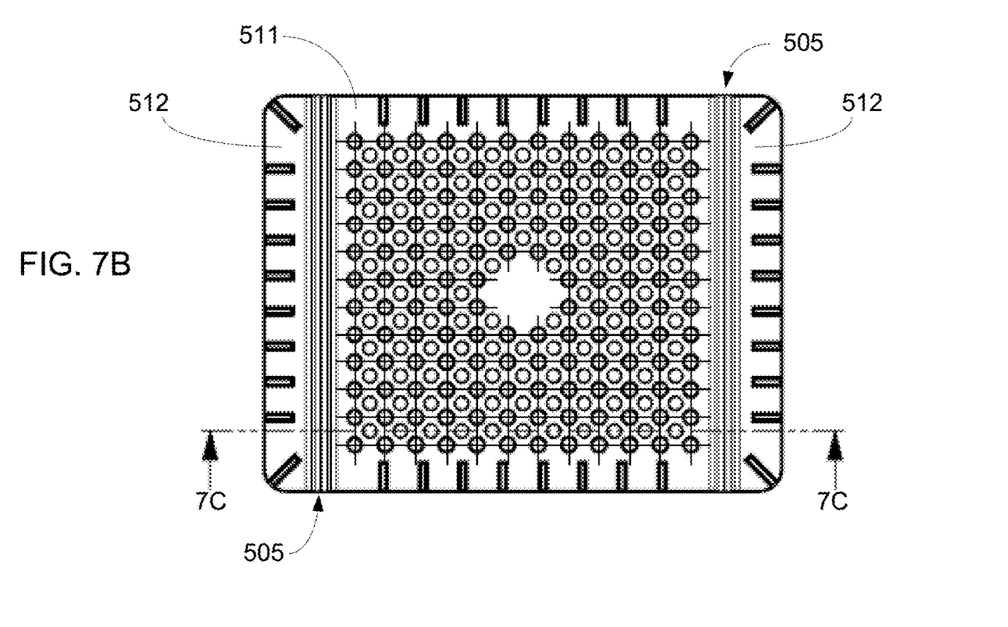
FIG. 7B is a top plan view of the device shown in FIG. 7A.
Figure 7C:
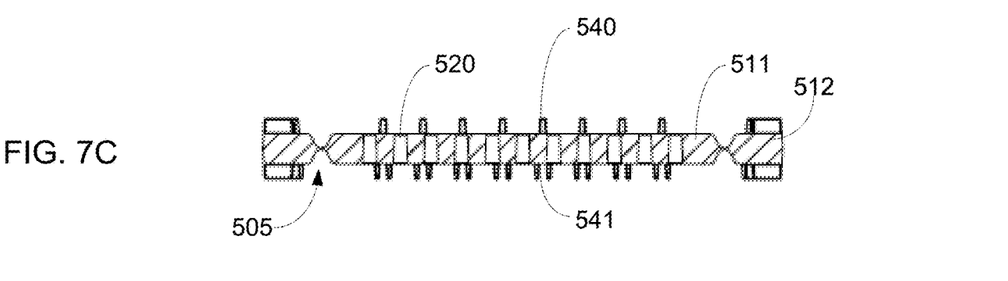
FIG. 7C is a sectional view taken across section 7C-7C of FIG. 7B.

FIGS. 7A-7C illustrate another example of a device 500 for reducing and/or eliminating water noise. In this embodiment, device 500 includes a main panel 511 and two side panels 512 each attached to the main panel by a "living hinge" 505. The main panel 511 includes holes 520 distributed across the main panel, single spaced-apart protrusions 540 extending from the top surface on the two long sides, and pairs of spaced-apart protrusions 541, offset from the top protrusions, extending from the bottom surface on the two long sides, as previously described. The side panels 512 also include protrusions 540, 541.

One embodiment of device 500 has a total size of 4.25 inches long by 3.25 inches wide, with the main panel 511 having a length of 3.75 inches and each of the side panels 512 having a length of 0.5 inches. The protrusions 540, 541 have a vertical height of 0.125 inches. The living hinges 505 are thin flexible portions of the same waterproof material, reduced to a fractional thickness. For example, the main panel 511 and side panels 512 can have a thickness of 0.25 inches, reduced to 0.015 inches at the living hinge. Thus, the device 500 may be easily manipulated into place by bending the side panels at the hinges 505. The pattern for device 500 may be made either by injection molding or stamping of waterproof material. It is also apparent from FIG. 7C that the paired bottom protrusions 541 are offset from the single top protrusions 540 such that the protrusions can be interposed when stacked together.

Figure 8A:
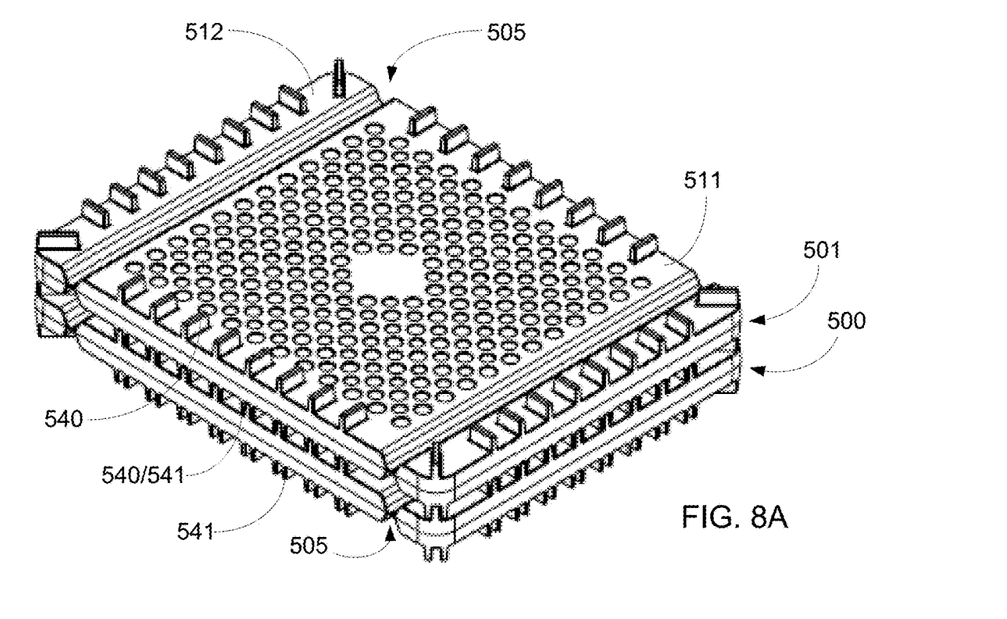
Figure 8B:
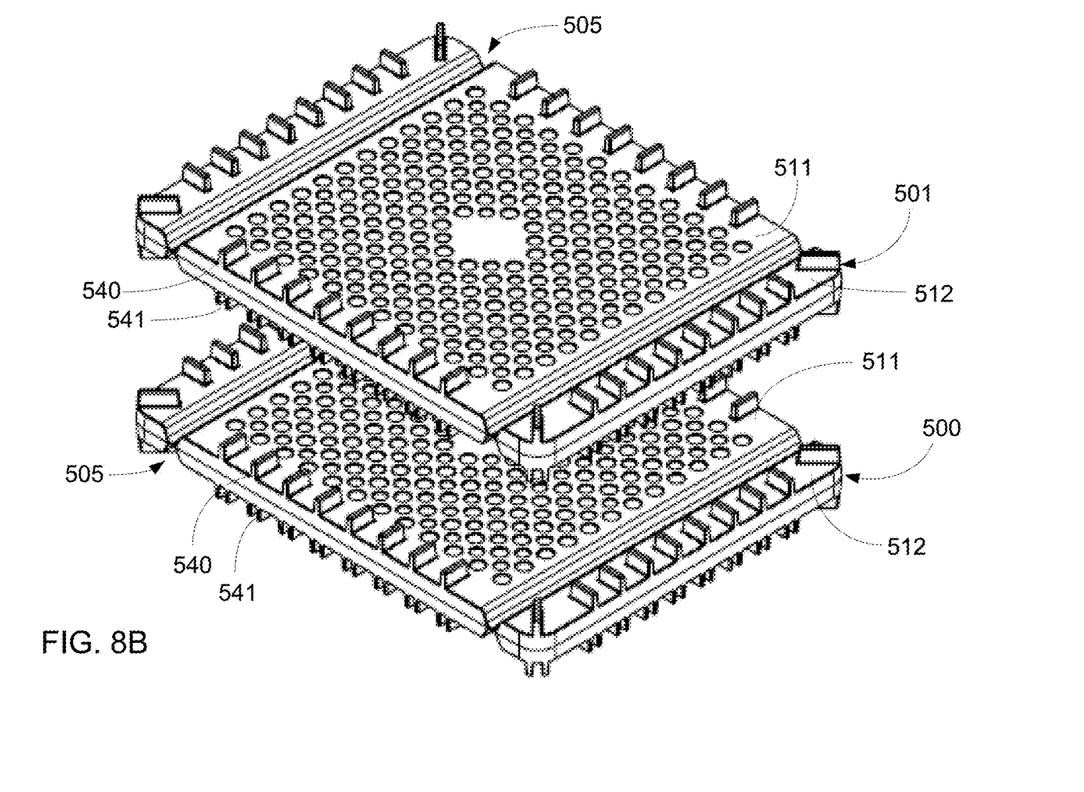
FIG. 8B is an exploded perspective view, both illustrating stacking one device on top of another device.

Referring now to FIGS. 8A-8B, as previously described, a second device 501 may be stacked on top of device 500. Devices 500, 501 are identical, each with a main panel 511, two side panels 512 each coupled to the main panel by a living hinge 505, single top protrusions 540, and paired bottom protrusions 541. The paired bottom protrusions 541 are offset from the corresponding single top protrusions 540 in a manner such that the single top protrusions of the bottom device 500 are interposed between corresponding paired bottom protrusions 541.

The description herein is provided for illustration only and should not be considered limiting. Many variations will be obvious to one with skill in this technology. For example, although injection molding is described above, the device may also be made by stamping a pattern

I claim:

1. An apparatus, comprising:
   a substantially planar device made from a waterproof material and having a plurality of small holes formed through the device, the holes distributed substantially uniformly across the device, each of the small holes measures less than about 0.5 mm in diameter; and
   a first plurality of recessed areas, each of the first plurality of recessed areas formed to surround a different one of the plurality of holes.

2. The apparatus of claim 1, further comprising:
   a frame for holding the planar device.

3. The apparatus of claim 2, wherein:
   the frame is rigid and includes one or more mechanisms for connecting the frame to a downspout.

4. The apparatus of claim 1, wherein:
   the device is flexible and may be manipulated to fit within a downspout.

5. The apparatus of claim 1, further comprising:
   a plurality of protrusions formed on a top side or a bottom side of the device along one or more edges of the device.

6. The apparatus of claim 5, further comprising:
   a first plurality of protrusions formed on a top side of the device along edges of the device; and
   a second plurality of protrusions formed on a bottom side of the device along edges of the device.

7. The apparatus of claim 6, wherein:
   the first plurality of protrusions and the second plurality of protrusions are configured to be interposed with each other when a first device is stacked on top of a second device.

8. An apparatus comprising:
   a substantially planar device made from a waterproof material and having a plurality of small holes formed through the device, the holes distributed substantially uniformly across the device, each of the small holes measures less than 0.5 mm in diameter; and
   a plurality of trenches formed at edges of the planar device.

9. An apparatus, comprising:
   a planar device made from waterproof material and having a top surface, a bottom surface and an edge;
   a plurality of small holes formed through the planar device and distributed substantially uniformly across the device, the small holes are less than approximately 5 mm;
   a first plurality of protrusions positioned along the edge of the planar device and extending from the top surface;
   a second plurality of protrusions positioned along the edge of the planar device and extending from the bottom surface, the first plurality of protrusions and the second plurality of protrusions are offset from each other on the top and bottom surfaces, respectively, such that a first planar device can be stacked on top of a second planar device and the second plurality of protrusions on the first planar device are interposed with the first plurality of protrusions on the second planar device; and
   an elongate downspout, wherein the planar device is positioned substantially perpendicular to a longitudinal axis of the downspout to receive water from the downspout and to discharge smaller water droplets through the plurality of small holes.

10. The apparatus of claim 9, wherein:
    each of the small holes includes at least one annular depression formed in either the top surface or the bottom surface to surround the respective hole.

11. The apparatus of claim 10, wherein:
    each of the small holes includes at least one annular depression formed in the top surface and the bottom surface to surround the respective hole.

12. The apparatus of claim 9, further comprising:
    a plurality of depressions, each depression formed around a different one of the plurality of small holes.

13. The apparatus of claim 9, further comprising:
    a plurality of trenches formed at the edge of the planar device.

14. The apparatus of claim 9, further comprising:
    a frame for holding the planar device.

15. The apparatus of claim 9, the planar device including a main panel and two side panels, each of the side panels coupled to opposite sides of the main panel by a living hinge, the plurality of small holes is formed on the main panel.

16. The apparatus of claim 15, wherein a first set of the first and second plurality of protrusions are configured on each of the side panels and a second set of the first and second plurality of protrusions are configured on the main panel.

17. The apparatus of claim 1, further comprising:
    a second plurality of recessed areas, each of the second plurality of recessed areas formed to surround a different one of the first plurality of recessed areas.

* * * * *